United States Patent
Raman et al.

(10) Patent No.: US 8,416,863 B2
(45) Date of Patent: Apr. 9, 2013

(54) SYSTEM AND METHOD FOR DETECTING MULTIPATH EFFECTS IN A GPS RECEIVER

(75) Inventors: Sundar Raman, Fremont, CA (US); Lionel Garin, Palo Alto, CA (US)

(73) Assignee: CSR Technology Inc., San Jose, CA (US)

( * ) Notice: Subject to any disclaimer, the term of this patent is extended or adjusted under 35 U.S.C. 154(b) by 903 days.

(21) Appl. No.: 11/555,596

(22) Filed: Nov. 1, 2006

(65) Prior Publication Data

US 2007/0098055 A1     May 3, 2007

Related U.S. Application Data

(60) Provisional application No. 60/732,977, filed on Nov. 2, 2005.

(51) Int. Cl.
*H04K 1/10* (2006.01)
*H04B 1/00* (2006.01)
*H04J 3/00* (2006.01)

(52) U.S. Cl. ............... 375/260; 375/150; 370/529

(58) Field of Classification Search .......... 375/137, 375/134, 150, 260; 455/522, 456.1; 370/529
See application file for complete search history.

(56) References Cited

U.S. PATENT DOCUMENTS

| | | | | |
|---|---|---|---|---|
| 5,808,582 A | * | 9/1998 | Woo ..................... | 342/357.61 |
| 5,943,331 A | * | 8/1999 | Lavean ................. | 370/335 |
| 5,974,329 A | * | 10/1999 | Wylie et al. ............ | 455/456.1 |
| 6,047,017 A | * | 4/2000 | Cahn et al. ............. | 375/148 |
| 6,198,765 B1 | * | 3/2001 | Cahn et al. ............. | 375/142 |
| 6,249,542 B1 | * | 6/2001 | Kohli et al. ............ | 375/150 |
| 6,259,401 B1 | * | 7/2001 | Woo .................... | 342/357.61 |
| 6,377,082 B1 | * | 4/2002 | Loinaz et al. .......... | 327/20 |
| 6,424,458 B1 | * | 7/2002 | Cornelius et al. ...... | 359/341.4 |
| 6,636,558 B1 | * | 10/2003 | Schnaufer et al. ...... | 375/150 |
| 7,333,532 B2 | * | 2/2008 | Baltersee et al. ....... | 375/148 |
| 2001/0050926 A1 | * | 12/2001 | Kumar .................. | 370/529 |
| 2002/0024696 A1 | * | 2/2002 | Maeda .................. | 359/124 |
| 2002/0086682 A1 | * | 7/2002 | Naghian ................ | 455/456 |
| 2002/0101912 A1 | | 8/2002 | Phelts et al. | |
| 2002/0146065 A1 | * | 10/2002 | Kohli et al. ............ | 375/150 |
| 2004/0127228 A1 | * | 7/2004 | You et al. .............. | 455/456.1 |
| 2005/0124368 A1 | * | 6/2005 | Diao et al. ............. | 455/522 |
| 2009/0115656 A1 | * | 5/2009 | Raman et al. .......... | 342/357.03 |

FOREIGN PATENT DOCUMENTS

DE              19842712 C1       9/1998

OTHER PUBLICATIONS

Fock et al. (Channel Tracking for Rake Receivers in Closely Spaced Multipath Environments; IEEE Journal on selected areas in communications; vol. 19, No. 12; Dec. 2001 ; pp. 2420-2431.*
PCT Search Report (PCT/US2006/060482), Apr. 24, 2007, SIRF Technology.
Gunar Fock, "Channel Tracking for Rake Receivers in Closely spaced Multipath Environments", IEEE Journal, vol. 19, No. 12, Dec. 2001.

* cited by examiner

*Primary Examiner* — David C. Payne
*Assistant Examiner* — Sarah Hassan
(74) *Attorney, Agent, or Firm* — Haynes and Boone LLP

(57) ABSTRACT

A multipath component in a GPS signal received is detected when an asymmetry exists in the correlation function of the received signal and the expected GPS signal. The multi-path component is also detected, even without a line-of-sight component in the received GPS signal, when a peak of the correlation function jumps a significant distance (i.e., a sudden, significant change in a detected code phase).

9 Claims, 3 Drawing Sheets

SYSTEM AND METHOD FOR DETECTING MULTIPATH EFFECTS IN A GPS RECEIVER

CROSS-REFERENCE TO RELATED APPLICATION

The present application is related to and claims priority to U.S. Provisional Application ("Copending Application"), entitled "System and Method for Detecting Multipath Effects in a GPS Receiver," by the same inventors, Ser. No. 60/732,977, filed on Nov. 2, 2005. The Copending Application is hereby incorporated by reference in its entirety.

BACKGROUND OF THE INVENTION

1. Field of the invention

The present invention relates to detecting in a global positioning system (GPS) signal received at a receiver the effects of multiple signal paths.

2. Discussion of the Related Art

A "multipath signal" is a signal that arrives at a receiver via multiple paths. The multiple signal paths result from reflection, diffraction and scattering of the signal on the direct (or "line-of-sight") signal path. Distortion to the received signal due to the multiple signal paths is a significant source of error in GPS measurements taken while a receiver is in an urban canyon, or is indoors. The distortion may significantly degrade the accuracy of any position determined from the received GPS signal.

SUMMARY

The present invention detects a multipath component in a GPS signal received. According to one embodiment of the invention, the multipath component is detected when an asymmetry exists in the correlation function of the received signal and the expected GPS signal.

According to another embodiment of the present invention, the multipath component is detected when a peak of the correlation function jumps a significant distance (i.e., a sudden, significant change in a detected code phase).

The present invention is better understood upon consideration of the detailed description below and the accompanying drawings.

DETAILED DESCRIPTION OF THE PREFERRED EMBODIMENTS

Figure 1:
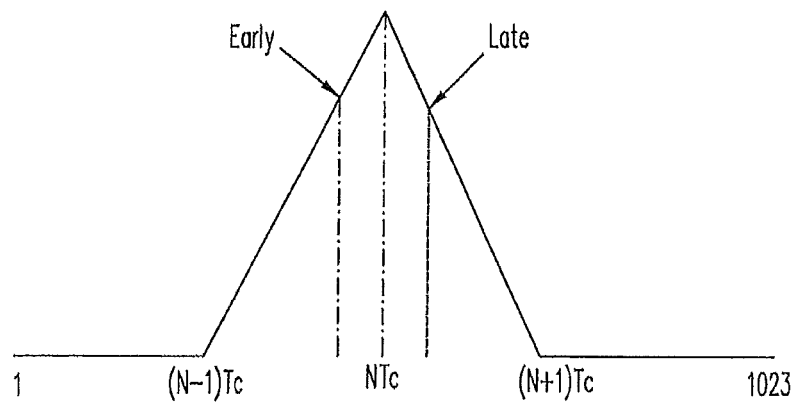
FIG. 1 shows a correlation function obtained by correlating a received GPS signal with the expected GPS signal generated at a receiver, in the absence of multipath effects.

FIG. 1 shows a correlation function obtained by correlating a received GPS signal with the expected GPS signal generated at a receiver, in the absence of multipath effects. As is well-known in the art, a GPS signal is modulated by a pseudorandom number. For example, in the C/A code, a 1023-bit (or 1023 chips) pseudorandom number is embedded in the GPS signal. When a received GPS signal is correlated with a properly delayed replica of the GPS signal (i.e., a replica of the GPS signal with the appropriate "code phase") of a given satellite, after compensation for Doppler and other effects on the detected carrier frequency (e.g., due to relative motions and other effects) between the GPS satellite and the receiver, a peak is observed in the correlation function. The GPS signal for that satellite is said to be "acquired" when the peak exceeds a threshold. In FIG. 1, the horizontal axis shows the code phases between 1 and 1023 chips, and the vertical axis shows the correlation function.

After the GPS signal is acquired, a receiver typically continues to track the GPS signal, so that the GPS signal for the satellite does not have to be reacquired in the next position determination. During tracking, the navigation message modulated onto GPS signal may be decoded to be determined, for example, GPS time. Tracking involves periodically adjusting in small code phase increments to center the peak of the correlation function between two selected code phases ("early" and "late") expected at a predetermined distance on either side of the peak (e.g., the early and the late code phases may be selected to be each ¼ chip away from the peak). When the peak of the correlation function is found, the expected early and late code phases are updated.

Figure 2:
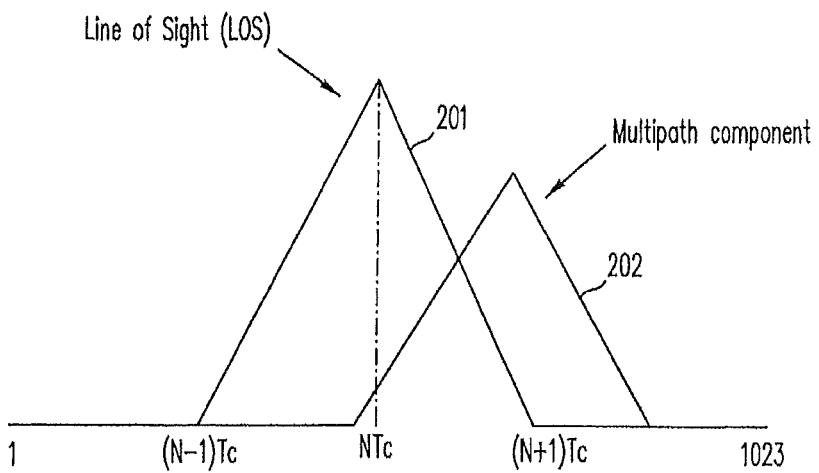
FIG. 2 shows individual contributions 201 and 202, which are the respective contributions to the correlation function of the line-of-sight component and the multipath component, in accordance with one embodiment of the present invention.
Figure 5:
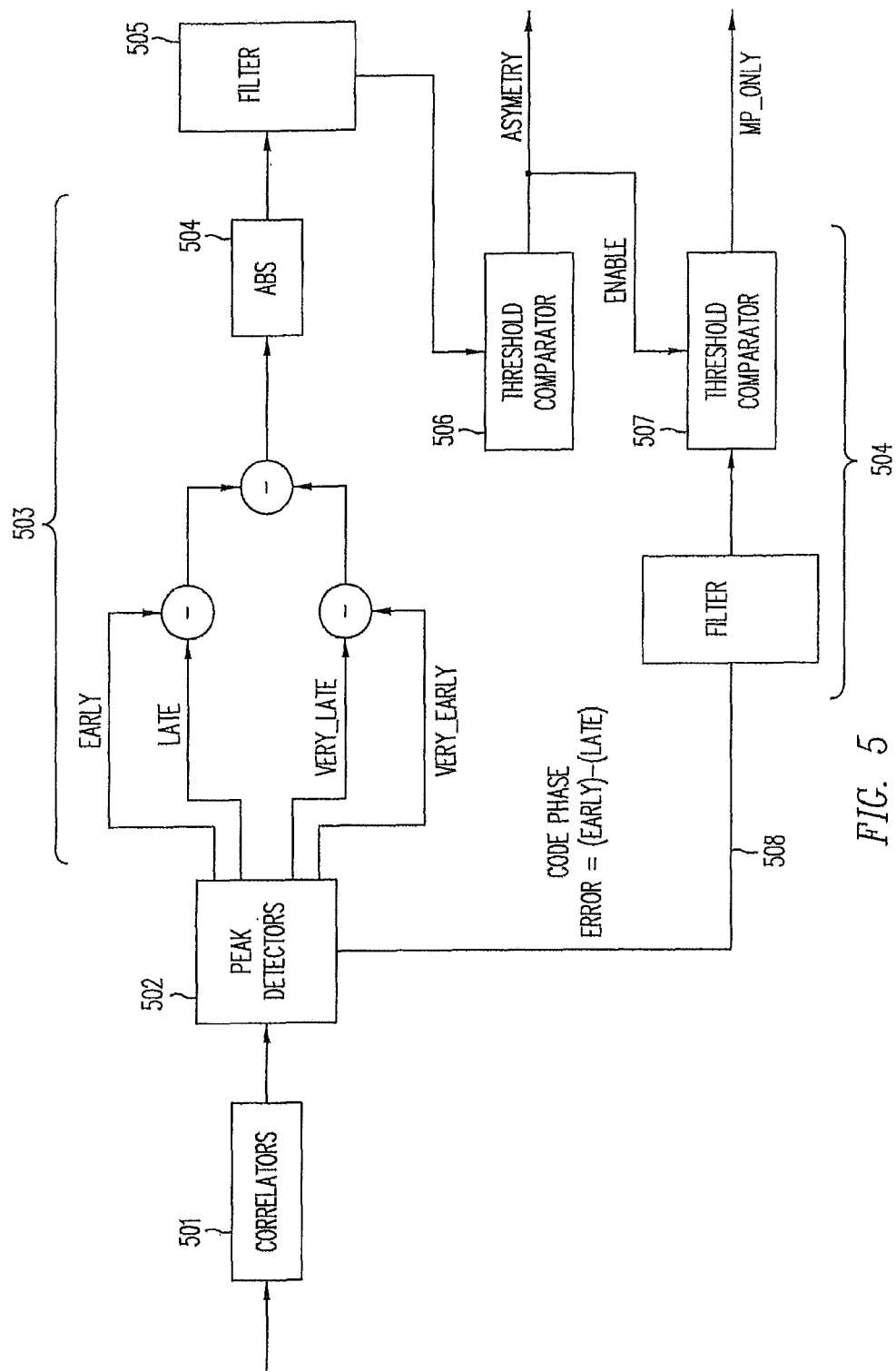
FIG. 5 illustrates the operations of the detectors according to one embodiment of the present invention.

FIG. 5 illustrates the operations of detectors provided in accordance with the present invention. The received GPS satellite signal is tracked by correlators (501). Peak detectors (502) detect and qualify the peaks in the correlation functions calculated by the correlators. A GPS signal arriving at a receiver via multiple paths includes a "line-of-sight" (LOS) component, which is the portion of the signal arriving at the receiver by the direct path, and a "multipath" (MP) component, which is the portion of the signal arriving at the receiver by other than the direct path. In one model, for the purpose of illustration only, the multipath component is an attenuated, delayed copy of the line-of-sight component. The present invention is applicable to multipath components which are much more complex (e.g., superposition of multiple attenuated echoes of the LOS component). FIG. 2 shows individual contributions 201 and 202, which are the respective contributions to the correlation function of the line-of-sight component and the multipath component, in accordance with one embodiment of the present invention. As shown in FIG. 2, the line-of-sight component and the multipath component each contribute a symmetrical peak to the correlation function.

Figure 3:
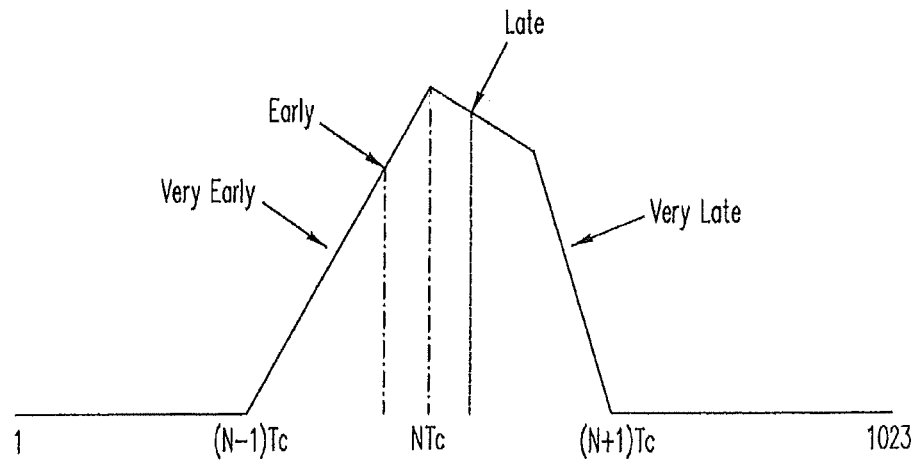
FIG. 3 shows correlation function 301 that is obtained by searching for the highest peak among correlation functions of a received signal having both the line-of-sight and multipath components of FIG. 2 and a replica of the expected GPS signal, in accordance with one embodiment of the present invention.

FIG. 3 shows correlation function 301 that is obtained by searching for the highest peak among correlation functions of a received signal having both the LOS and MP components of FIG. 2 and a replica of the expected GPS signal, in accordance with one embodiment of the present invention. As shown in FIG. 3, this correlation function is asymmetrical about the peak value. That is, the correlation values at corresponding equidistant code phases from the peak are not equal: the value of the correlation function at −½ chip ("very_early") from the peak does not equal the value at the correlation function at ½ chip ("very_late") from the peak, and the value of the correlation function at −¼ chip ("early") from the peak does not equal the value of the correlation function at ¼ chip ("late") from the peak.

This asymmetry can be detected by a detector ("first detector," indicated by reference numeral 503 in FIG. 5) that implements, for example, the logic equation:

$E(z)=\text{abs}(\text{very\_early}-\text{very\_late}-\text{early}+\text{late})$, where $E(z)$ is the output value of the detector.

According to one embodiment of the present invention, to provide this first detector with noise immunity, the output value may be filtered using filter 505 implementing the equation:

$E\_\text{filtered}(z)=\alpha(E(z))+(1-\alpha)(E\_\text{filtered}(z-1))$, where $\alpha$ is inversely proportional to the time constant of the filter. (This filter may be initialized to zero at start-up).

Figure 4:
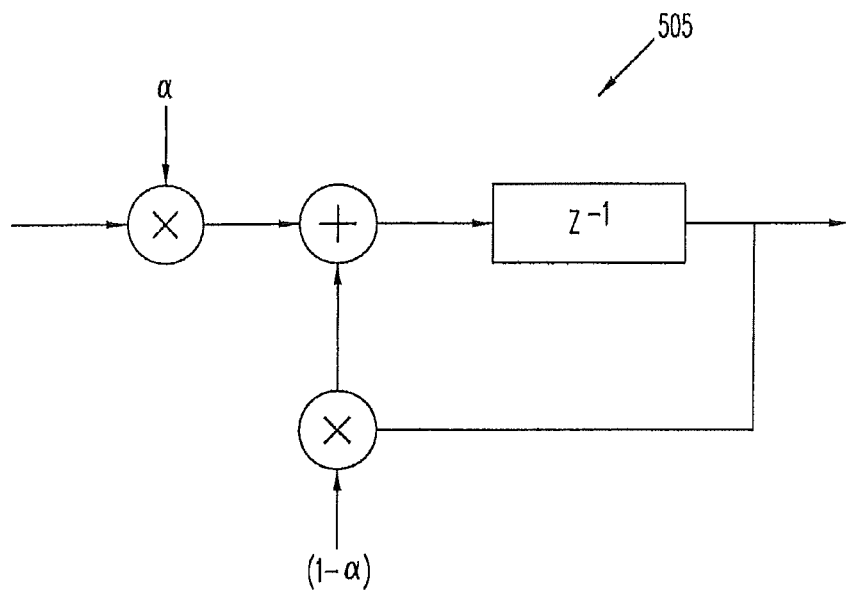
FIG. 4 shows filter 400, which can be used to filter the output of a detector according to the present invention.

Filter 505, which provides a weighted average of an input signal and a delayed version of the input signal, is illustrated in FIG. 4. For an environment with good signal-to-noise ratio (e.g. $C/N_o > 30$ dBHz), this filter may have a time constant of 50 samples (i.e., 1 second, at a tracking sampling interval of 20 milliseconds). Otherwise, at a lower signal-to-noise ratio (e.g., 25 dbHz$<C/N_o<$30 dBHz) the time constant may be a longer value, such as 100 samples (i.e., 2 seconds). If the filtered error value, $E\_\text{filtered}(z)$, exceeds a threshold (at threshold comparator 506), a multipath condition is deemed detected.

The first detector discussed above presumes that the multipath signal includes a non-zero LOS component. However, in some urban canyons and indoors, the receiver may not receive the LOS component at all. Thus, one embodiment of the present invention provides a different detector ("MP-only detector," indicated by reference numeral 504) for this condition. The MP-only detector detects in threshold comparator 507 the condition when a large jump in code phase (i.e., due to the disappearance of the LOS component) in the direction of increasing code phase occurs, beyond any code phase error expected of reasonable user dynamics (e.g., change in direction of travel). This code phase error may also be filtered using the filter shown in FIG. 4.

In one embodiment, using both detectors, when a large jump in code phase occurs after the multipath condition is detected by the first detector (i.e., detection of an asymmetry in the correlation function), indicating non-zero LOS and MP components if, at a later time, the asymmetry in the correlation function disappears, accompanying by a jump in code phase, an MP component-only multipath signal condition ("MP-only condition") is detected. This condition is also referred to as "Non-line of sight condition."

In one embodiment, the code phase error is given by $E\_\text{code\_phase}(z)=-(\text{mEarly}-\text{mLate})$, indicated by reference numeral 508; where mEarly and mLate are the magnitudes of the Early and Late values. Beginning at the time when the LOS component disappears, the $E\_\text{code\_phase}(z)$ value becomes non-zero for a time period (e.g., 2 seconds). The code phase error may be filtered with a filter having a time constant of 100 samples (e.g., 2 seconds, at a 20 millisecond tracking interval). A similar $E\_\text{code\_phase}(z)$ jump is seen when the LOS component reappears.

In one embodiment, to reduce the probability of a false trigger or "false-alarm," the MP-only detector 504 is activated only after the first detector indicates a multipath condition (e.g., by providing from detector 503 an enable signal to detector 504). In that embodiment, the MP-only filter indicates an MP-only condition when the output of the MP-only detector exceeds a first threshold. The MP-condition is reset if a lesser jump in code phase (i.e., a second threshold lesser in magnitude than the first threshold) in the direction of decreasing code phase is seen. The asymmetry in thresholds for the code phase transitions above reduces the probability of a missed trigger for the termination of the MP_only condition.

This invention has advantages over other existing methods for multipath mitigation. For example, unlike existing multipath mitigation methods, which typically assume an LOS component and only a simple multipath component, detectors of the present invention make no assumption regarding the multipath component. Regardless of the shape of the multipath component, the resulting correlation function would be asymmetrical in practice and thus detectable by a detector of the type exemplified by the first detector. Further, most existing techniques assume the LOS component to be stronger than multipath component. This assumption may not be valid when the receiver is indoors. However, because the MP-only detector detects a jump in code phase, the strength of the multipath component relative to the strength of the LOS component is not determinative in the MP-only detector.

When the measurements are taken on a Non Line-of-Sight (NLOS) component, the measurement errors are very large. The NLOS condition is difficult to detect, and no known method exists to detect such a condition. Detectors of the present invention handle the NLOS condition under some constraints (namely switching from a LOS to a NLOS without losing lock).

Under the present invention, once the multipath condition is detected, another technique can be applied to mitigate the multipath condition. For example, existing multipath cancellation techniques (e.g., successive cancellation methods) may be used. When the multipath condition is not present, most existing multipath mitigation techniques introduce noise, incur large pull-in times, or both. By decoupling multipath detection from multipath mitigation, this extra cost incurred by existing multipath mitigation techniques is avoided.

The thresholds for the detectors can be set based on a number of factors. For example, the detector is more sensitive when the multipath component is delayed at least a predetermined distance relative to the LOS component (e.g., 100 m-325 m). A detector of the present invention described above, for example, can be characterized according to its probability of false alarm or false detection $P_{fd}$ (i.e., detecting a multipath condition when none is present). Further, as exemplified above, the thresholds can also be set taking into account the signal strength (i.e., C/No) in the receiver's environment. Another figure of merit—the probability of a missed detection $P_{md}$ (i.e., failing to detect an actual multipath condition)—is not easily derived, due to the lack of sensitivity of the detector to several multipath parameters (e.g., relative powers of the LOS and the multipath components, the filter time constant $\tau$, and the code phase offset). In practice, an estimate of the probability of detection $P_d$ is available only when the error due to the multipath condition has a significant impact on the measurement. The relative powers between the LOS component and the mulitpath component may also affect $P_{fd}$ (i.e., probability of detecting a mulitpath condition when none is present) and $P_{md}$. Generally, a detector may be used at lower signal strength at the cost of a higher probability of missed detection The above detailed description is provided to illustrate the specific embodiments of the present invention and is not intended to be limiting. Numerous modification and variations within the scope of the present invention are possible.

We claim:

1. A multi-path signal detector for a spread spectrum signal, comprising:
   correlators receiving the spread spectrum signal for computing a plurality of correlation functions, wherein each correlation function correlates the spread spectrum signal to a reference signal delayed by a selected delay value;

a first detector for detecting an asymmetry in the computed correlation functions to indicate the presence of multi-path;

a first filter for removing noise from an output signal from the first detector;

a second detector for detecting a non-line-of-sight condition having no line-of-sight component in the spread spectrum signal responsive to the indication from the first detector of the presence of multi-path, wherein the second detector for detecting a non-line-of-sight condition detects an abrupt change in code phase when the asymmetry in the computed correlation function from the first detector disappears; and a second filter for removing noise from an output signal of the second detector.

2. A multi-path signal detector as in claim 1 wherein the first detector comprises computed a difference between a first subset of the correlation function and a second subset of the correlation functions.

3. A multi-path signal detector as in claim 2, wherein the first subset of the correlation functions comprises correlation functions corresponding to early code phases and wherein the second subset of the correlation functions comprises correlation functions corresponding to late code phases.

4. A method for detecting a multi-path component in a spread spectrum signal, comprising:

computing a plurality of correlation functions each being a correlation between the spread spectrum signal and a reference signal delayed by a selected delay value;

filtering the plurality of correlation functions to remove noise;

detecting an asymmetry in the filtered correlation functions to indicate a presence of multi-path;

responsive to an indication of multi-path, detecting a non-line-of-sight condition having no line-of-sight component in the spread spectrum signal by detecting an abrupt change in code phase when the asymmetry in the filtered correlation functions disappears; and filtering an output signal representing the non-line-of-sight condition.

5. A method as in claim 4, wherein detecting the asymmetry comprises computing a difference between a first subset of the correlation function and a second subset of the correlation functions.

6. A method as in claim 5, wherein the first subset of the correlation functions comprises correlation functions corresponding to early code phases and wherein the second subset of the correlation functions comprises correlation functions corresponding to late code phases.

7. A method in claim 4, wherein detecting a non-line of sight condition comprises computing a difference between a correlation corresponding to an early code phase and a correlation corresponding to a late code phase.

8. A method as in claim 4, wherein said filtering an output signal representing the non-line-of-sight condition comprises filtering by an infinite impulse response filter.

9. The multi-path signal detector of claim 1, wherein the second filter comprises an infinite impulse response filter.

* * * * *